Figure 1:
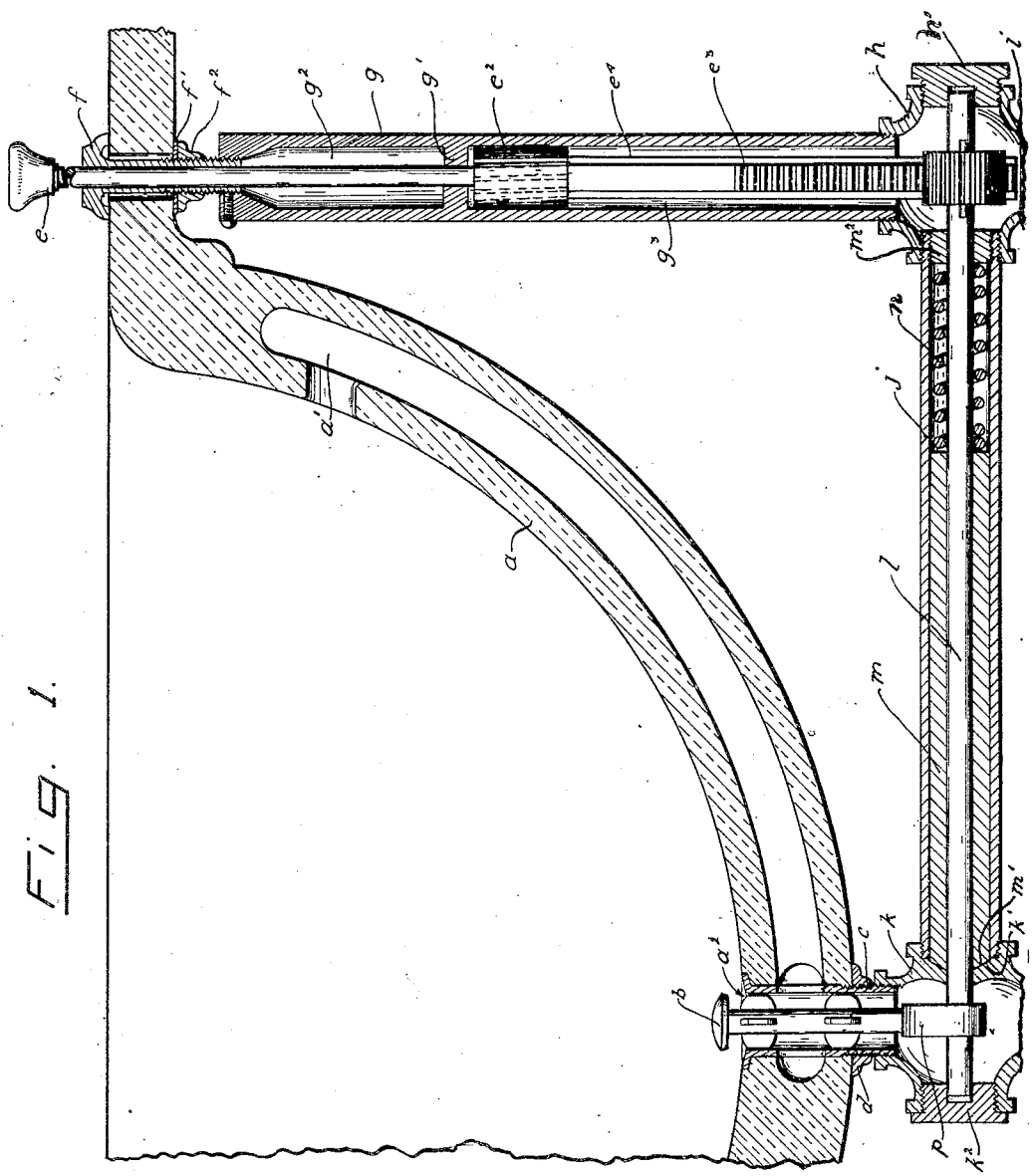

June 24, 1930.  F. A. JOHNSON  1,766,712

WASTE VALVE MECHANISM

Filed Oct. 30, 1928

INVENTOR
Frank A. Johnson
BY
ATTORNEY

Patented June 24, 1930

1,766,712

UNITED STATES PATENT OFFICE

FRANK A. JOHNSON, OF PORTLAND, OREGON

WASTE-VALVE MECHANISM

Application filed October 30, 1928. Serial No. 316,075.

My invention relates to waste valve mechanism for use in lavatories, tubs and the like, and has for its principal object the provision of devices for retarding or cushioning the operating parts to diminish the maximum speed of operation and thereby to lengthen the life of such mechanism.

A further and more particular object of my invention is to provide a retarding element of the plunger type with rack-and-pinion operating mechanism, the whole encased within conduits and filled with some appropriate fluid, the plunger engaging the bore of the conduit and thus requiring displacement of such fluid when the parts are moved to cushion and retard the speed of operation thereby.

The details of construction and mode of operation are hereinafter pointed out in greater detail with reference to the accompanying drawings, in which the figure is a sectional view of such mechanism controlling the waste valve of a receptacle.

My improved waste valve mechanism is shown in connection with a receptacle $a$ having a usual overflow passage $a'$ and waste outlet $a^2$. Seating in such outlet is a valve $b$ reciprocally mounted therein in the usual manner. A thimble $c$ provides a seat for such valve and is held in place by a lock nut $d$ engaging the bottom of such receptacle.

The waste valve mechanism comprises a push rod $e$ having the usual knob at its upper end, which extends above the receptacle and slidingly engages a member $f$ locked in place by a washer and nut $f'$ and $f^2$ respectively. Screw-threaded thru such member $f$ is the casing $g$ with the bore of which the plunger $e^2$ engages. Such plunger $e^2$ is an integral part of the rod $e$ as is a rack $e^3$ extending below such plunger and within such casing. The back $e^4$ of such rack is rounded to conform to the shape of the bore of the casing and thus to guide rack $e^3$. Such casing $g$ is provided with a transverse partition $g'$ thru which the rod $e$ passes and such partition $g'$ thus divides the bore of the casing $g$ into two chambers or compartments, the chamber $g^2$ being above the partition and the chamber $g^3$ below. A coupling $h$ is fastened to the lower end of the casing and the upper end of a continuing casing $i$ arranged in axial alinement with the casing $i$ is fastened to such casing also. When such rod $e$ is depressed, the lower end of the rack $e^3$ extends into such member $i$, which is closed at its lower end.

A casing $j$, extending at right angles to the casing $g$, is fastened to the latter by the coupling $h$. The other end of such casing $j$ is fastened to a coupling $k$, which latter is also fastened to the thimble $c$, thus making a continuous conduit of the elements $g$, $j$ and $c$. A shaft $l$ is arranged in such casing $j$ and carried by a packing and sealing element $m$, which is free within the bore of such casing $j$. A spring $n$ coiled about the shaft $l$ tends to force such member $m$ toward the left, as viewed in the figure, to prevent any fluid contained within the casings to escape into the waste outlet of the receptacle $a$. The opposed faces $m'$ and $k'$ of the members $n$ and $k$ are mutually inclined, as shown in the figure, to aid in such sealing action. The other end of such casing $j$ is substantially sealed by a threaded plug $m^2$ against which the end of the spring $n$ bears. On one end of the shaft $l$ an eccentric cam $p$ is mounted, and on the other end a pinion $q$, the cam $p$ being carried within the coupling $k$ and the pinion $q$ within the coupling $h$. The ends of such shaft $l$ are supported by caps $k^2$ and $h'$ in such couplings, respectively.

The operation of my improved waste mechanism is as follows:

With the devices arranged as shown in the figure, they are moved so as to permit the valve $b$ to seat by depressing the rod $e$. This causes the plunger $e^2$ correspondingly to be depressed and to be forced to displace the fluid within the casing $g$. In some cases I prefer to use a liquid such as oil and in other cases merely air, depending upon the amount of resistance desired or needed. The plunger $e^2$ is provided with a series of longitudinal apertures $e^5$ which restrict the flow of liquid thru such plunger. The depression of the rod $e$ also causes a similar movement to be given to the rack $e^3$ and thus rotation of pinion $q$, which meshes with such rack, causes the eccentric $p$ to be rotated. The length of travel given the rod $e$ is sufficient to permit the eccentric $p$ to turn one-half of a revolution and thus the valve is opened by contact with the eccentric portion of greatest offset and is closed by contact with the portion of least offset. Such eccentric is thus arranged so that such valve in upper and lower positions engages it at "dead center," so to speak.

The chamber $g^2$ is proportioned relative to the portion of the chamber $g^3$ above the plunger $e^2$ so as to have greater capacity so that if a liquid fluid is used as the cushioning or retarding agent, none of the latter will be forced out of the top of the casing, even tho the whole capacity of the chamber $g^3$ above the plunger is moved upwardly thru the chamber $g^2$. The sealing element $m$ is arranged so that pressures built up within the chamber $g^3$ tending to force the liquid entrapped therein to escape into the waste outlet, will aid the action of the coil spring $n$ to provide a tight joint at $m'$.

I claim:

1. In waste valve mechanism in combination with a reciprocally mounted waste plug of a closed conduit, a spring extended sealing member loosely mounted in such conduit, such member and such pipe being relatively formed to form a fluid-tight joint, a shaft journaled in such conduit, a cam element carried by such shaft engaging the lower end of such waste plug, a reciprocal rod also mounted in such conduit and being operatively connected with such shaft, such conduit constituting a fluid cylinder and a piston carried by such rod engaging the bore of the conduit.

2. In waste valve mechanism in combination with a reciprocally mounted waste plug of a closed conduit, a shaft journaled in such conduit, a cam element carried by such shaft engaging the lower end of such waste plug, a reciprocal rod also mounted in such conduit and being operatively connected with such shaft, such conduit constituting a fluid cylinder, such latter course being divided into two chambers, a piston carried by such rod engaging the bore of the conduit and the other chamber in such course having greater capacity than the displacement of such piston, for the purpose specified.

In testimony whereof I affix my signature.

FRANK A. JOHNSON.